(No Model.) 2 Sheets—Sheet 1.
J. C. WANDS.
FILTER.
No. 534,056. Patented Feb. 12, 1895.
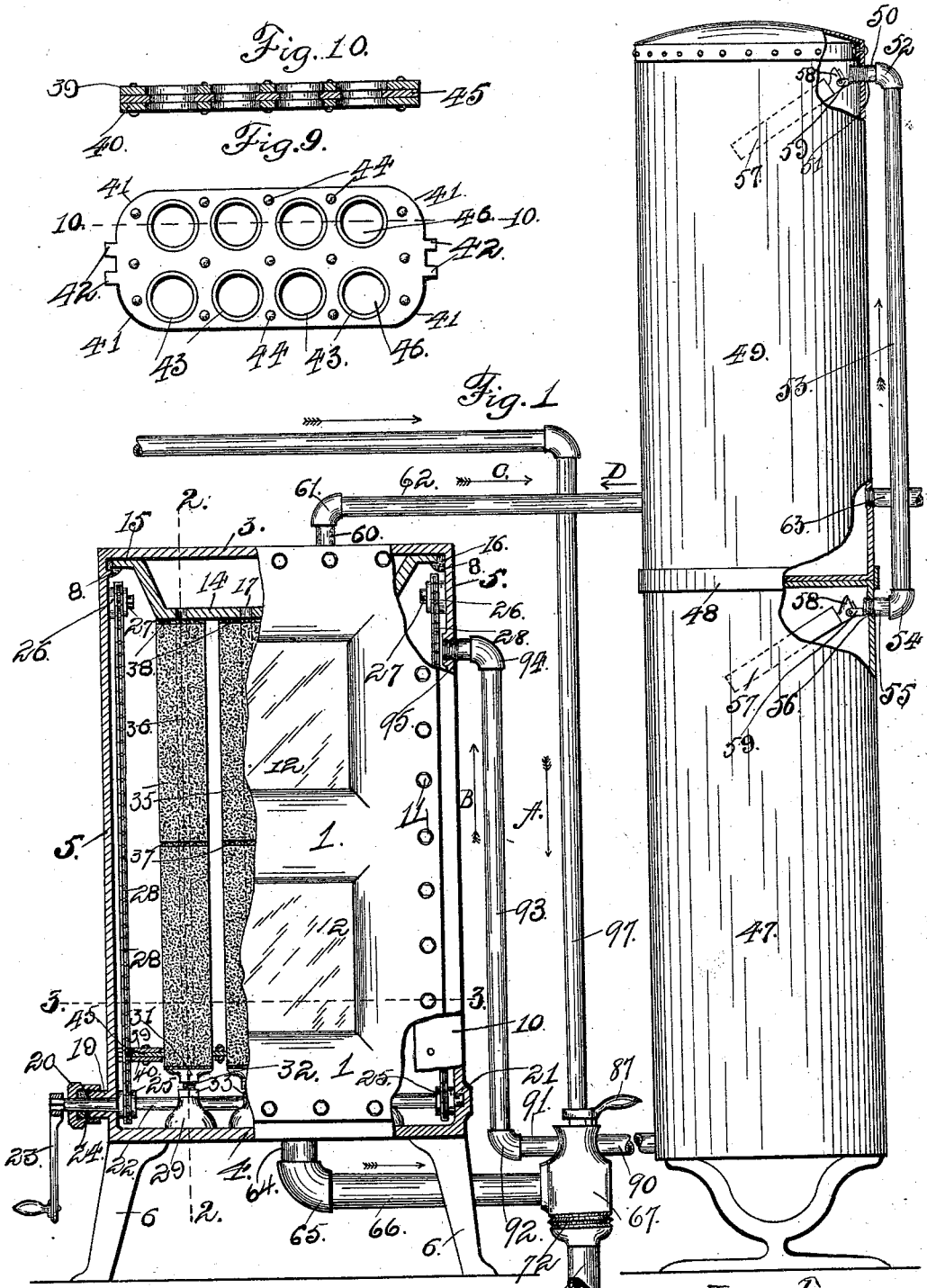
Attest:
A. A. Glaudemeisters.
W. P. Smith.
Inventor:
John C. Wands
by Higdon and Higdon and Longan, Attys

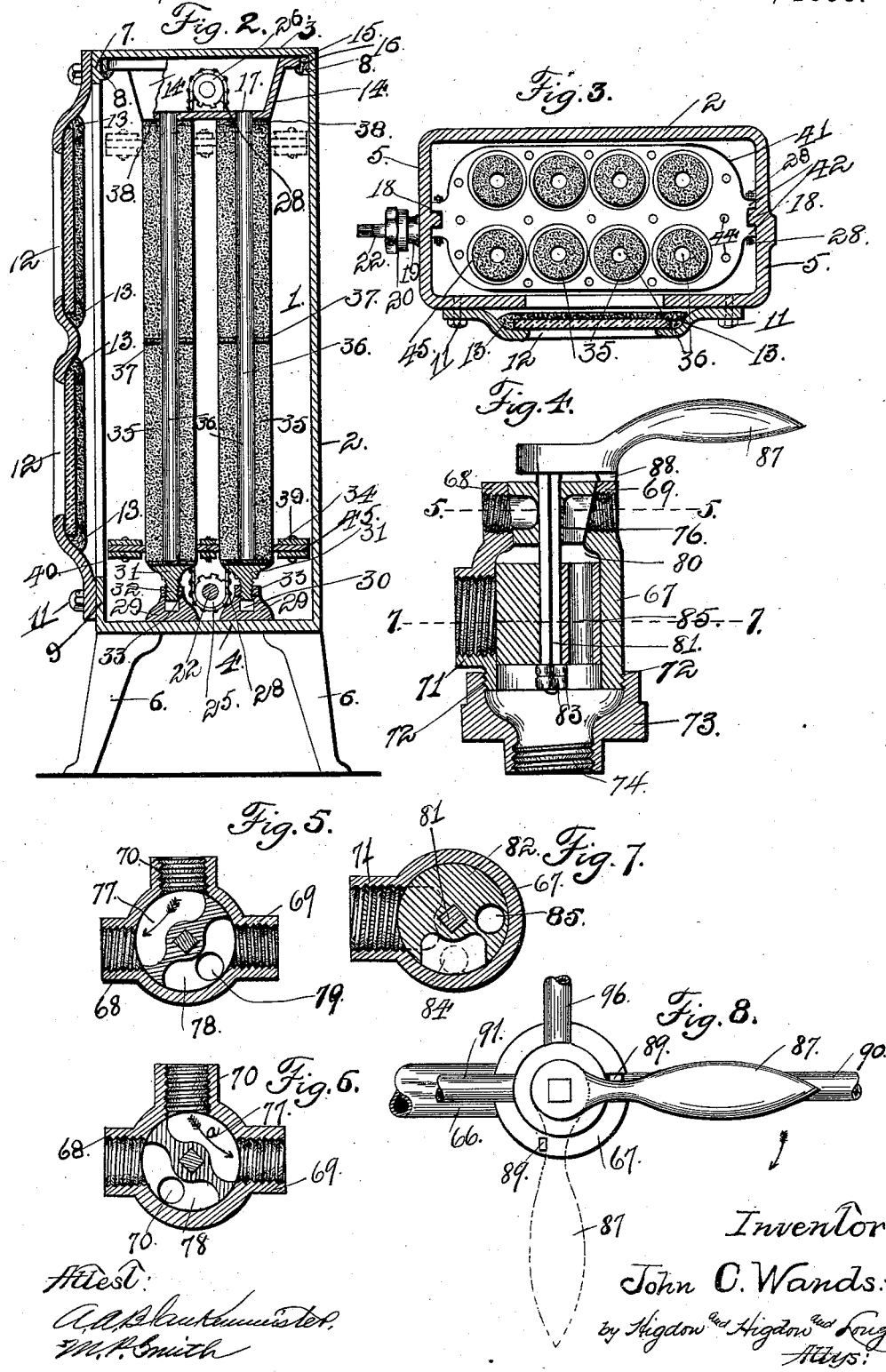

UNITED STATES PATENT OFFICE.

JOHN C. WANDS, OF ST. LOUIS, MISSOURI.

FILTER.

SPECIFICATION forming part of Letters Patent No. 534,056, dated February 12, 1895.

Application filed September 4, 1894. Serial No. 522,126. (No model.)

*To all whom it may concern:*

Be it known that I, JOHN C. WANDS, of the city of St. Louis, State of Missouri, have invented certain new and useful Improvements in Filters, of which the following is a full, clear, and exact description, reference being had to the accompanying drawings, forming a part hereof.

The object of my invention is to construct a filter having positioned therein the usual filtering stones, a cleaning or scraping device for the filtering stones that may be easily and quickly operated, and the location of a pair of reservoirs adjacent the filter and connections between said reservoirs and filter, said filter, reservoirs and connections therefor to possess superior advantages in point of simplicity, durability and general efficiency.

A further object of my invention is to locate a specially formed valve in the connections between the filter and reservoirs, said valve being for the purpose of controlling the movement or flow of water through the filter and reservoirs.

A further object of my invention is to so locate a reservoir containing filtered water as that said filtered water, or a portion thereof, may be forced through the filtering stones and interior of the filter, thereby thoroughly cleaning the same.

My invention consists in certain novel features of construction, combination and arrangement of parts, hereinafter described and claimed.

Referring to the drawings: Figure 1 is a front elevation of my complete filter and its attachments, portions of said filter and attachments being broken away to more clearly illustrate the interior portions thereof. Fig. 2 is a vertical sectional view on the indicated line 2—2 of Fig. 1. Fig. 3 is a longitudinal sectional view on the indicated line 3—3 of Fig. 1. Fig. 4 is a vertical sectional view of the valve I employ in carrying out my invention. Fig. 5 is a longitudinal cross-sectional view on the indicated line 5—5 of Fig. 4, and showing the interior of the valve thrown in its normal position. Fig. 6 is a sectional view similar to Fig. 5, and showing the interior portion of the valve thrown to a position when the filter and filtering stones therein are being cleansed. Fig. 7 is a cross-sectional view on the indicated line 7—7 of Fig. 4. Fig. 8 is a top plan view of the valve. Fig. 9 is a plan view of the cleaning device I employ on the interior of the filter. Fig. 10 is a longitudinal sectional view on the indicated line 10—10 of Fig. 9.

Referring by numerals to the accompanying drawings, 1 indicates the main body portion of my filter, the same being preferably cast and comprising the back 2, top 3, bottom 4 and sides 5. Thus a box-like structure is formed, the same adapted to be sustained on legs or standards 6. Depending from the front side of the top 3 is an integral portion 7. Extending along the inner face of this depending portion 7 across the sides 5 and the interior of the back 2 is an integral bead 8, the purpose of which will be presently shown.

Extending a slight distance upward from the front side of the bottom 4 and formed integral therewith is a portion 9. In a like manner, extending inward from the forward portions of the sides 5 are the integral portions 10. To these extending portions 7, 9 and 10 are fixed by means of headed bolts 11, or in any suitable manner, the front plate of the filter, said front plate being so cast or formed as that the central portion of it protrudes a slight distance beyond the plane occupied by the edges thereof. In this central portion are formed openings 12, said openings being closed by sections or plates of heavy glass placed upon the inside of the openings 12 and held securely thereto by means of hydraulic cement 13, or other suitable substance that will form a perfectly water tight joint. By this construction it will be seen that windows are formed in the front plate of the filter, thereby permitting inspection of the interior of the filter at all times.

A cast metal pan 14, the same being provided with an outwardly extending flange 15, is adapted to be positioned immediately under the top 3 of the filter and be securely held in position by means of cement, or other suitable material 16, being interposed between the flange 15 and the flange 8. This flange 8 serves to retain the cement in position and in turn the cement securely holds the cast metal pan in position. In the bottom of this cast metal pan 14 are formed rows of apertures 17.

Formed integral on the inner faces of the side walls 5 of the filter and at points midway between the front and back thereof, are integral ribs 18, the same extending in true vertical lines from the top to the bottom of the filter. Cast integral with one of the sides 5 of the filter, and at a point near the bottom plate 4 thereof and midway between the front and side walls thereof, is a bearing 19, the exterior of which is screw-threaded and adapted to receive an interiorly screw-threaded cap 20. Passing through this bearing 19 and cap 20 and extending longitudinally across the filter (the forward end being located in a bearing 21 formed in the side wall 5 directly opposite the bearing 19) is a shaft 22. Outside the cap 20 and upon the shaft 22 is located a crank-handle 23, whereby said shaft is turned. By placing suitable packing 24 between the bearing 19 and the cap 20, it will be seen how a stuffing-box for the shaft 22 is formed. Rigidly mounted upon the shaft 22 on the interior of the filter and adjacent the side walls 5 thereof are sprocket-wheels 25. Directly above these sprocket-wheels 25 and immediately beneath the top 3 of the filter are sprocket-wheels 26, the same being loosely mounted upon stub-shafts 27 formed integral with and extending inwardly from the side walls 5. Endless sprocket-chains 28 pass over these pairs of sprocket-wheels 25 and 26.

Circular blocks 29 provided with vertical passages 30 are mounted on the bottom 4 of the filter in parallel lines. Sustaining plates 31, the same being circular in plan view, are provided with downwardly pending screw-threaded portions 32, which, after passing through nuts 33, pass into the recesses 30 in the circular blocks 29. Directly upon the upper surfaces of these circular plates 31 are laid rubber disks 34, upon which rubber disks are positioned the first tier of filtering stones 35. These filtering stones 35 are constructed of any suitable filtering material, preferably "tripoli," and are provided with the centrally located vertical passages 36. Upon the tops of these filtering stones are placed rubber or leather washers 37, and upon said washers 37 the second tier of filtering stones are placed which are in every way similar to the stones just described.

The filtering stones may be made of any length desired. I have shown but two tiers between the circular plates 31 and the bottom of the cast metal pan 14.

Between the upper ends of the upper tier of filtering stones and the bottom of the pan 14 are placed rubber or leather washers 38, which are similar to the washers 37.

When the stones are properly positioned, the vertical passages therein will co-incide with the apertures 17 formed in the bottom of the cast metal pan 14. When the stones are correctly positioned by manipulating the nuts 33 in the right direction upon the depending screw-threaded portion 32, said stones will be raised a slight distance and stand in rigid substantial positions.

The cleaning device of which I make use in cleaning the outside of the filtering stones is constructed in the following manner: Two plates 39 and 40, the same being identical in form and construction, are made rectangular with the rounded corners 41 and ears 42 projecting from the ends of said plates, said ears adapted to be located on each side of the vertical ribs 18 on the interior of the filter, thus forming a guide for the vertical movement of said plates. Constructed in the bodies of the plates 39 and 40 in parallel rows are circular apertures 43, the same corresponding with the position of the vertically arranged filtering stones 35. Positioned between the plates 39 and 40 and held securely therein by means of rivets or bolts 44, is a section of leather or rubber or analogous material 45, the same being constructed with circular apertures 46, the diameters of which are equal to the exterior diameters of the filtering stones 35. Thus when the cleaning device is positioned horizontally within the filter as shown in Fig. 3, the inner edges of the circular apertures 46 contact at all points on the peripheries of the filtering stones 35. The normal position of this device is at the bottom of the interior of the filter, or as shown in Fig. 2. One of the links of each of the sprocket-chains 28 is secured to each side of the device adjacent the ears 42 thereof.

Located adjacent the filter and sustained in any suitable manner is a reservoir 47 which may be termed an air reservoir. Located upon this air reservoir and held in position thereon by means of a band 48, is a reservoir 49. A short section of horizontal pipe 50 is screwed into the aperture 51 near the top of the reservoir 49 and is connected by means of an elbow 52 to a vertical pipe 53 that runs to a point adjacent the top of the reservoir 47. Said pipe 53 is there provided with an elbow 54 and short section of pipe 55 that is screwed into an aperture 56 in the top of the reservoir 47. The inner ends of the pipes 50 and 56 are fitted with an automatic cut-off valve that comprises the floats 57 preferably cylindrical and hollow, which floats are provided with leather or rubber faced heads 58 that are hinged to arms 59 extending from the lower sides of the inwardly projecting pipes 50 and 55. A horizontal pipe 60 leads from a chamber formed between the cast metal pan 14 and the top 3 of the reservoir, and is provided with an elbow 61 on the outside of said reservoir, said elbow connecting the pipe 60 to a horizontal pipe 62 that leads to the interior of the reservoir 49. A pipe 63 leads from a point near the bottom of the reservoir 49 to a supply faucet, said supply faucet being located wherever desired.

Leading from the interior and bottom of the filter is a pipe 64, the same being connected by an elbow 65 to a horizontal pipe 66. This horizontal pipe 66 leads to a point between the reservoir 47 and the filter and has located upon its screw-threaded end a valve, which I will now proceed to describe. This valve comprises the cylindrical casing 67 which is provided near its top with the diametrically opposite interiorly screw-threaded lugs 68 and 69. Between these lugs 68 and 69 and on the rear side of the valve is a similar interiorly screw-threaded lug 70.

In the body of the valve-casing 67 and immediately below the lug 68 thereof, is an enlarged interiorly screw-threaded lug 71 that is for the reception of the screw-threaded end of the pipe 66. The lower end of the valve is exteriorly screw-threaded as indicated by 72 and adapted to receive a cap 73, the lower end 74 of which is interiorly screw-threaded and adapted to receive a pipe 75 that leads to the sewer, or other waste.

Mounted for rotation in the upper end of the valve-casing 67 is the upper valve 76, the same being cylindrical in form and provided with semi-circular grooves 77 and 78 in its periphery. An aperture 79 connects the groove 78 with an enlarged chamber 80 in the body of the valve-casing 67 below the valve 76.

Extending through the valve 76 is a squared shaft 81 which has mounted thereon a circular valve 82 which is adapted to rotate in the enlarged chamber 80 adjacent the lug 71. This lower valve 82 is held in position upon the squared shaft 81 by means of nuts 83 being mounted beneath said valve 82 and upon the rounded lower end of the shaft 81. A vertical groove 84 is formed in one side of the valve 82, and immediately adjacent this groove or recess 84 and extending vertically through the valve 82, is a passage 85, the same being preferably circular in cross-section. Mounted upon a squared projection 86 rising from the top of the valve 76 is a handle 87, the same being provided with a downwardly pending lug 88 that engages with lugs or stops 89 formed integral with the top of the valve-casing 67. If these lugs 89 are located on lines drawn at right angles to each other from the center of the valve, it will be seen how the handles 87 will be allowed to make but a quarter of a turn. Leading from the interiorly screw-threaded lug 69 is a pipe 90 that connects with the bottom of the reservoir 47.

A horizontal pipe 91 is screwed into the interiorly screw-threaded lug 68 and extends a slight distance toward the filter, and is there provided with an elbow 92, from which extends in a vertical direction a pipe 93. Connected to the upper end of this pipe 93 by an elbow 94 is a short horizontal pipe 95 that leads to the interior of the filter at a point near the top thereof. Connected by a horizontal pipe 96 entering the screw-threaded lug 70 is a vertical pipe 97 that leads from the water supply.

The operation is as follows: The various parts being in the position shown in Fig. 1 and the valve in the position as shown in Figs. 4, 5 and 7, the water from the supply to be filtered passes through the pipe 97 in the direction of the arrow "A." Passing through the horizontal pipe 96, it passes through the semi-circular groove or passage 77, and from thence through the pipes 91 and 93 in the direction of the arrow "B" into the interior of the filter. It now passes or percolates through the filtering stones 35 in the usual manner and in so passing becomes thoroughly cleansed and filtered; from thence it passes upward through the vertical passages 36 into the chamber formed between the pan 14 and the top 3 of the filter; from thence through the pipes 60 and 62 in the direction of the arrow "C" into the reservoir 49. From this point it is drawn off through the pipe 63. Should at any time, however, the supply of filtered water rise in the reservoir 49 until it reaches the float 57, it will raise said float, thereby closing the end of the horizontal pipe 50 which will effectually prevent the escape or discharge of any of the filtered water. When it is desired to clean the filter, the crank-handle 23 is so manipulated as to alternately raise and lower the plates 39 and 40 carrying the leather or rubber scraper 45, until the sediment or deposit on the outside of the filtering stones 35 is entirely scraped off or removed. The valve-handle 87 is now thrown to the position as shown by dotted lines in Fig. 8. This throws the upper valve 76 to the position as shown in Fig. 6, and the passage 84 to the position as shown by dotted lines in Fig. 7, or adjacent the mouth of the pipe 66, or where the same discharges into the valve-casing 67. This operation having taken place, the supply of water coming through the pipe 97 will pass through the upper valve in the direction of the arrow "A" and into the reservoir 47, which, as before stated, is an air reservoir. As the water continues to flow into said reservoir, the air within said reservoir will be compressed and caused to pass through the pipes 55, 53 and 50 and into the filtered water reservoir 49. The action of said compressed air upon the filtered water will be to drive said filtered water through the pipes 62 and 60 in the direction of the arrow "D." Said water will pass into the chamber between the pan 14 and the top 3 of the filter. From here said filtered water passes downwardly through the vertical passages 36, out through the filtering stones 35, and into the interior of the filter. Thus said filtering stones will be entirely cleansed. After said water has passed through the filtering stones, it will pass through the pipes 64 and 66, through the vertical passage 84, through the cap 73 and into the pipe 75 that leads to the sewer. When the filter has been sufficiently cleansed, the handle 87 is again thrown to its normal position, or to that shown by solid lines in Fig. 8, which will cause the water supply to pass through the upper valve and filter in the manner first described. The water that passed into the air reservoir 47 will now return through the horizontal pipe 90, semi-circular passage 78 in the upper valve, downwardly through the aperture 79 into the chamber 80, through the vertical passage 85 in the lower valve, through the cap 73 and into the pipe 75 that leads to the sewer.

Thus it will be seen how I have constructed a filter that thoroughly and efficiently filters and cleanses the water that passes through it, said filter capable of being quickly and easily cleansed by first scraping the sediment from the exterior of the filtering stones and then passing clean filtered water through said filtering stones.

What I claim is—

1. In a filter, a series of tubular filtering stones located on the interior of the filter in parallel lines, said filtering stones being laid in tiers and provided with rubber, leather, or analogous, washers between said tiers, a circular plate sustaining each of said filtering stones, said circular plate being provided with a screw-threaded depending portion upon which is located a nut that bears upon the top of a circular block, thus forming means for rigidly positioning the filtering stones.

2. In a filter, a cleaning device, comprising a shaft extending horizontally across the bottom of the filter, sprocket-wheels rigidly mounted upon said shaft, sprocket-wheels loosely mounted upon studs located near the top of the filter, sprocket-chains passing over these sprocket-wheels, a pair of identical plates provided with ears on their ends and circular apertures in their body portions, a sheet of rubber or leather adapted to be bolted and securely held between the identical plates, said sheet of rubber or leather being provided with circular apertures, the edges of which engage the peripheries of the vertical filtering stones, said identical plates being secured to the vertically moving sprocket-chains at a point near the ears on the sides thereof.

3. A filter, comprising a rectangular metal casing, plates of glass, or other transparent material, placed in the front plate of the filter, a series of filtering stones arranged in parallel rows and extending vertically within the filter, a cleaning device adapted to engage against and scrape the outer surfaces of the filtering stones, an air reservoir and a filtered water reservoir located adjacent the filter, said reservoirs being connected by a vertical pipe, suitable connections between the reservoirs and the filter, and a valve located in said connections, whereby the flow of water through the filter can be reversed.

4. In a filter, a valve located in the connections between the filter and the reservoirs, said valve comprising an outer casing into which the waste pipe discharges and from which the pipe leads to the sewer, connections with the water supply, with the filter and air reservoir to the top of the valve-casing, a circular rotating valve in the top of the valve-casing, in the periphery of which are semicircular grooves or passages, a vertical passage leading from one of these passages to the chamber in the main body of the casing, a squared shaft leading from this upper valve downward within the chamber in the main casing of the valve, a circular valve located upon this squared shaft, said circular valve being provided with a vertical groove or passage which does not communicate with the chamber formed between the two valves, a vertical passage or bore formed in this lower valve leading from the chamber between the two valves to a discharge pipe, and a handle located on a projection from the top of the upper valve, whereby said valves are partially rotated.

5. In a filter, the combination of a rectangular casing, tubular filtering stones located within said casing, a cleaning device adapted to be operated by sprocket-chains carried by sprocket-wheels upon a shaft operated by a crank-handle, said cleaning device to contact with the outer surfaces of the tubular filtering stones, an air reservoir and a filtered water reservoir located adjacent said filter, tubular connections between said reservoirs, automatic cut-off devices for the ends of said tubular connections, a tubular connection between the filtered water reservoir and the filter, a tubular connection from the water supply to the interior of the filter, a tubular connection between the filter and the air reservoir, a tubular connection from the interior of the filter to the waste pipe, and a valve so located as that the hereinbefore tubular connections connect said valve, said valve adapted to be so positioned as to deflect the course of the water supply and cause the same to enter the air reservoir, thereby compressing the air in said reservoir which acts upon the filtered water and causes the same to pass through the filter and filtering stones.

In testimony whereof I affix my signature in presence of two witnesses.

JOHN C. WANDS.

Witnesses:
E. E. LONGAN,
MAUD GRIFFIN.